(12) United States Patent
Jang (10) Patent No.: US 8,416,320 B2
(45) Date of Patent: Apr. 9, 2013

(54) IMAGE PROCESSING METHOD AND APPARATUS FOR GENERATING AND DISPLAYING SCREEN NAIL IMAGES

(75) Inventor: Sung-kyu Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 12/564,972

(22) Filed: Sep. 23, 2009

(65) Prior Publication Data

US 2010/0079621 A1  Apr. 1, 2010

(30) Foreign Application Priority Data

Sep. 26, 2008  (KR) ................. 10-2008-0094742

(51) Int. Cl.
*H04N 5/76* (2006.01)
(52) U.S. Cl. .................. 348/231.2; 348/222.1
(58) Field of Classification Search ............. 348/231.99, 348/231.3, 333.05, 222.1, 240.2, 345, 231.2, 348/346
See application file for complete search history.

(56) References Cited

U.S. PATENT DOCUMENTS

| | | | | |
|---|---|---|---|---|
| 6,906,746 B2 * | 6/2005 | Hijishiri et al. | ............ | 348/240.2 |
| 2005/0134719 A1 * | 6/2005 | Beck | ......................... | 348/333.11 |
| 2006/0238636 A1 * | 10/2006 | Shiohara | .................. | 348/333.01 |
| 2006/0274960 A1 * | 12/2006 | Tamaru | ......................... | 382/274 |
| 2007/0035778 A1 * | 2/2007 | Yoshizawa et al. | ........... | 358/302 |
| 2008/0218595 A1 * | 9/2008 | Kawahara | .................. | 348/222.1 |
| 2008/0297622 A1 * | 12/2008 | Miyashita | .................. | 348/229.1 |

FOREIGN PATENT DOCUMENTS

| | | | |
|---|---|---|---|
| EP | 1901553 A1 * | 3/2008 | |
| EP | 2012528 A1 * | 1/2009 | |

* cited by examiner

*Primary Examiner* — Nelson D. Hernández Hernández
(74) *Attorney, Agent, or Firm* — Drinker Biddle & Reath LLP (57) ABSTRACT

An exemplary image processing method and apparatus, and an exemplary digital photographing apparatus, may develop and display a screen nail image and a face screen nail image rather than a full resolution image. The screen nail image may be generated using RAW data output from an image sensor, a predetermined face region of the screen nail image may be detected, and the face screen nail image may be generated from the screen nail image using coordinates of the detected face region. Thus, power consumption and processing time delay caused by processing all parts of a full resolution image may be minimized, and a quality of the full resolution image may be conveniently checked. As a result, a user may conveniently select and store an image in high-speed still picture photographing.

20 Claims, 7 Drawing Sheets

IMAGE PROCESSING METHOD AND APPARATUS FOR GENERATING AND DISPLAYING SCREEN NAIL IMAGES

CROSS-REFERENCE TO RELATED PATENT APPLICATION

This application claims the priority benefit of Korean Patent Application No. 10-2008-0094742, filed on Sep. 26, 2008, in the Korean Intellectual Property Office, the disclosure of which is incorporated herein in its entirety by reference.

BACKGROUND

1. Field of the Invention

The present invention relates to an image processing method and apparatus, and more particularly, to a method and an apparatus for processing an image captured by a digital photographing apparatus for generating and displaying screen nail images.

2. Description of the Related Art

Anticipations for still picture photographing have increased with the commercialization of image sensors capable of performing high-speed still picture photographing, e.g., high-speed Complementary Metal Oxide Semiconductor (CMOS) sensors. Some products including such image sensors have come out in the market.

In order to realize such a system, the amount of input data is typically several times higher than a signal processing capacity of a camera signal processing unit. Thus, the input data is typically stored in a memory in a RAW file format, instead of being immediately processed. Therefore, a user is typically able to develop a raw file to check a photographed picture.

The high-speed still picture photographing provides users with an advantage of obtaining multiple images but the high-speed still picture photographing has a few disadvantages in that obtained images must typically be sorted and then stored, so as to reduce a storage space. Moreover, when obtained full resolution images are processed and stored by an image processing unit, a processing speed for the full resolution images and storing speed of the full resolution images on a storage medium are typically delayed. Thus, a processing or storing delay that is 5 times to 10 times greater than the time to capture the image generally occurs. For example, in order to compress an image captured for 1 second in a Joint Photographic Experts Group (JPEG) format and then store the compressed image in a flash storage medium, 10 seconds corresponding to 10 times 1 second are required in a typical camera system, thereby inconveniencing users.

In order to solve these problems, a method by which a user reduces images stored in a RAW format to a screen nail format, instead of processing all of the stored images, develops only the reduced images, and pre-views the reduced images has been suggested so as to freely select and store images, instead of developing all of the obtained images.

However, since the developed images are very small in size, it is very difficult to determine in a picture whether a focus was correctly adjusted and whether noise or quivering occurred during the photographing of a particular person.

SUMMARY

An exemplary image processing method and apparatus may display a reduced screen nail image and a face screen nail image that is formed by clipping only a face region of an image, rather than the full resolution image.

An exemplary digital photographing apparatus may minimize power consumption and processing time delay occurring during the processing of all of the full resolution images, and may conveniently check the qualities of the full resolution images, in order to provide a user with the convenience to select and store images in high-speed still picture photographing.

An exemplary image processing method may include generating a screen nail image using RAW data output from an image sensor, detecting a predetermined face region of the screen nail image, and generating a face screen nail image from the screen nail image using coordinates of the detected face region.

The image sensor may include a high-speed Complementary Metal Oxide Semiconductor (CMOS) image sensor.

The image processing method may further include displaying the face screen nail image.

The image processing method may further include, when a user selects the displayed face screen nail image, displaying the screen nail image corresponding to the face screen nail image.

The image processing method may further include displaying the screen nail image and the face screen nail image together.

The image processing method may further include storing the RAW data output from the image sensor in a memory.

The image processing method may further include, when a size of the detected face region varies, re-sizing the size of the face region to correspond to that of the face region of the face screen nail image.

The image processing method may further include, when the user selects one of the displayed face screen nail image and screen nail image, recording a raw image corresponding to the selected one of the displayed face screen nail image and screen nail image in a predetermined recording medium.

An exemplary image processing method may include setting a Region Of Interest (ROI) of a predetermined subject, photographing the subject, generating a screen nail image using RAW data output from a high-speed Complementary Metal Oxide Semiconductor (CMOS) image sensor, generating a ROI screen nail image from the screen nail image using coordinates of the set ROI, and displaying the ROI screen nail image.

When a user selects the displayed ROI screen nail image, displaying the ROI screen nail image may further include displaying the screen nail image corresponding to the ROI screen nail image.

The ROI may be selected by a user using a preview screen.

An exemplary image processing apparatus may include a screen nail generator which generates a screen nail image using RAW data output from an image sensor, a face detector which detects a predetermined face region of the screen nail image, and a face screen nail generator which generates a face screen nail image from the screen nail image using coordinates of the detected face region.

The image sensor may include a high-speed Complementary Metal Oxide Semiconductor (CMOS) image sensor.

The image processing apparatus may further include a display which selectively displays one of the screen nail image and the face screen nail image.

The image processing apparatus may further include a Region Of Interest (ROI) detector which detects a ROI selected by a user using a preview screen, and a ROI screen nail generator which generates a ROI screen nail image from the screen nail image using coordinates of the detected ROI.

The image processing apparatus may further include a display which selectively displays the screen nail image and the ROI screen nail image.

An exemplary digital photographing apparatus may include a memory which temporarily stores RAW data output from a high-speed Complementary Metal Oxide Semiconductor (CMOS) image sensor, a screen nail generator which generates a screen nail image using the stored RAW data, a face detector which detects a predetermined face region of the screen nail image, a face screen nail generator which generates a face screen nail image from the screen nail image using coordinates of the detected face region, an image signal processing unit which develops the screen nail image and the face screen nail image, and a display which selectively displays the developed screen nail image and the face screen nail image.

The digital photographing apparatus may further include a Region Of Interest (ROI) detector which detects a ROI selected by a user using a preview screen, and a ROI screen nail generator which generates a ROI screen nail image from the screen nail image using coordinates of the detected ROI.

The display may selectively display the screen nail image and the ROI screen nail image.

BRIEF DESCRIPTION OF THE DRAWINGS

The above and other features and advantages of the present invention will become more apparent by describing in detail exemplary embodiments thereof with reference to the attached drawings listed below.

DETAILED DESCRIPTION

Exemplary embodiments of the present invention will now be described more fully with reference to the accompanying drawings. In the description of the exemplary embodiments, detailed descriptions of commonly-used technologies or structures as known in the art may be omitted for clarity. Terms used herein are understood to be interpreted broadly in accordance with the contents of the entire specification.

Figure 1:
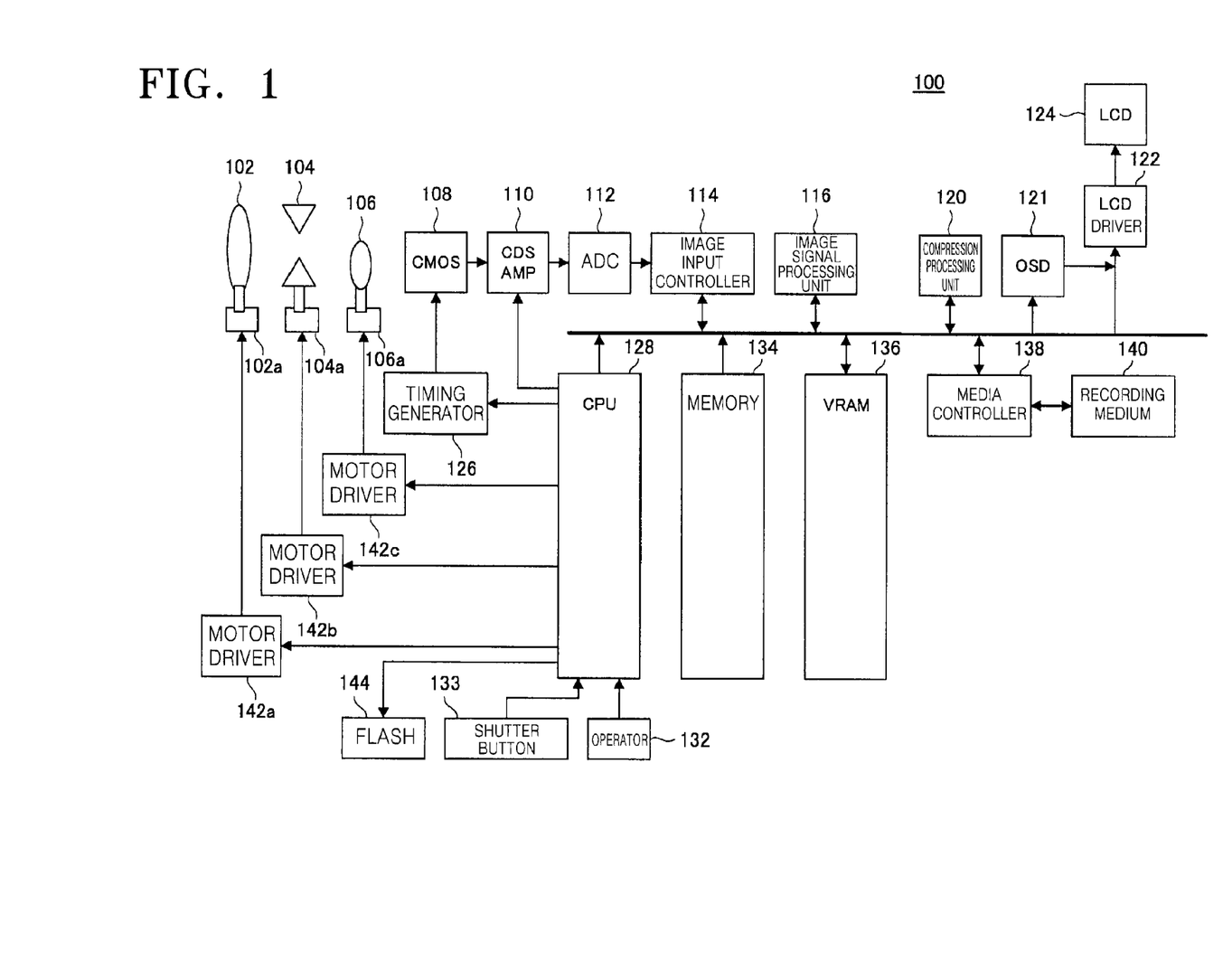
FIG. 1 is a schematic block diagram of an exemplary digital photographing apparatus.

Embodiments of a digital photographing apparatus and a photographing method will now be described. FIG. 1 is a schematic block diagram of an exemplary digital photographing apparatus 100. The digital photographing apparatus 100 may include a zoom lens 102, an aperture 104, a focus lens 106, driving devices 102a, 104a, and 106a, a Complementary Metal Oxide Semiconductor (CMOS) device 108, a Correlated Double Sampling (CDS) amplifier 110, an analog-to-digital converter (ADC) 112, an image input controller 114, an image signal processing unit 116, a compression processing unit 120, an On Screen Display (OSD) 121, a Liquid Crystal Display (LCD) driver 122, an LCD 124, a timing generator 126, a Central Processing Unit (CPU) 128, an operator 132, a shutter button 133, a memory 134, a Video Random Access Memory (VRAM) 136, a media controller 138, a recording medium 140, motor drivers 142a, 142b, and 142c, and a flash 144.

The zoom lens 102 may be moved back and forth along an optical axis direction by the driving device 102a in order to sequentially change a focal length, and may change a size of a subject to be photographed. When an image is captured, the aperture 104 may control an intensity of light from the subject that is incident on the CMOS device 108, in response to the driving device 104a. The focus lens 106 may be moved back and forth along the optical axis direction by the driving device 106a to control a focus of the light from the subject incident on the CMOS device 108.

In the present embodiment illustrated in FIG. 1, the digital photographing apparatus 100 includes one zoom lens 102 and one focus lens 106; however, the present invention is not limited thereto and thus other embodiments of the digital photographing apparatus 100 may include two or more zoom lenses 102 and two or more focus lenses 106.

The CMOS device 108 may convert the light incident through the zoom lens 102, the aperture 104, and the focus lens 106 into an electric signal. In the present embodiment illustrated in FIG. 1, a time required for controlling incident light to extract an electric signal may be adjusted by an electronic shutter. Alternatively, the time may be adjusted by a mechanical shutter. In the present embodiment illustrated in FIG. 1, an imaging unit comprises the zoom lens 102, the aperture 104, the focus lens 106, and the CDS amplifier 110. However, a set of elements of the imaging unit is not limited thereto, and thus some embodiments of the imaging unit may not include the zoom lens 102 or the aperture 104.

In the present embodiment illustrated in FIG. 1, the CMOS device 108 is used, but a high-speed CMOS image sensor may also be used. In case the high-speed CMOS image sensor is used and included in the CMOS device 108, the digital photographing apparatus 100 may sequentially capture 60 images per second using the high-speed CMOS image sensor. A CDS circuit and an amplifier may be integrated into the CDS amplifier 110, wherein the CDS circuit may include a kind of sampling circuit that removes noise from the electric signal output from the CMOS device 108, and the amplifier may also remove noise from the electric signal and then amplify the electric signal. In the present embodiment illustrated in FIG. 1, the digital photographing apparatus 100 may comprise a circuit into which a CDS circuit and an amplifier are integrated. Alternatively, the CDS circuit and the amplifier may be constituted as individual circuits.

The ADC 112 may convert the electric signal generated by the CMOS device 108 into a digital signal to generate RAW image data. The image input controller 114 may control an input of the RAW image data generated by the ADC 112 to the memory 134. The image signal processing unit 116 may correct a gain of the intensity of light or calibrate a white balance of the intensity of light, for the electric signal output from the CMOS device 108. The image signal processing unit 116 may obtain exposure data of the captured image. The exposure data may include an auto focusing (AF) valuation value or an auto exposure (AE) valuation value, and the image signal processing unit 116 may calculate the AF or AE valuation value.

The compression processing unit 120 may compress the image, which is developed by the image signal processing unit 116, into image data having an appropriate format. Here, the compression format of the image data may include a reversible format or an irreversible format. As an example of the appropriate format, the image may be transformed into a Joint Photographic Experts Group (JPEG) format or a JPEG 2000 format.

The OSD 121 may display a set screen of the digital photographing apparatus 100 on the LCD 124. The LCD 124 may display a live view before a photographing operation is performed, or display various set screens of the digital photographing apparatus 100, the captured image, or the like. The LCD driver 122 may be interposed between the OSD 121 and the LCD 124 to display image data or various types of information of the digital photographing apparatus 100 using the LCD 124.

The timing generator 126 may input a timing signal to the CMOS device 108. A shutter speed may be determined using the timing signal input from the timing generator 126. In other words, the driving of the CMOS device 108 may be controlled by the timing signal input from the timing generator 126, and image light may be incident from a subject within a time when the CMOS device 108 is driven, in order to generate an electric signal that forms a basis of the image data.

The CPU 128 may execute a signal-based command for the CMOS device 108, the CDS amplifier 110, or the like, or execute an operation-based command to operate the operator 132. In the present embodiment illustrated in FIG. 1, the digital photographing apparatus 100 includes only one CPU; however, the present invention is not limited thereto and thus the digital photographing apparatus 100 may include an additional CPU so that the CPU and the additional CPU execute the signal-based and operation-based commands, respectively.

The operator 132 may include elements that perform an operation of the digital photographing apparatus 100 or various settings required in photographing. In other words, a power button, a cross key, a selection button, etc., may be installed in the operator 132, wherein the cross key may set a soft focus effect, and the selection button may select a photographing mode or a photographing drive mode. The shutter button 133 may be used for performing a photographing operation. The shutter button 133 may focus a subject when the shutter button 133 is semi-pressed and image the subject when the shutter button 133 is completely-pressed.

The memory 134 is an example of an image storage unit and may temporarily store the captured image. The memory 134 may have a memory capacity that can store a plurality of images. The image input controller 114 may control reading and writing of an image from/to the memory 134.

Since the VRAM 136 may store contents displayed using the LCD 124, a resolution or a maximum number of colors of the LCD 124 may depend on a memory capacity of the VRAM 136.

The recording medium 140 is an example of an image recorder and may record the captured image. The media controller 138 may control inputs and outputs to and from the recording medium 140. The recording medium 140 may include a memory card, which is a card type memory unit for recording data in a flash memory.

The motor drivers 142a, 142b, and 142c respectively control the driving devices 102a, 104a, and 106a that respectively operate the zoom lens 102, the aperture 104, and the focus lens 106. The motor drivers 142a, 142b, and 142c may be interposed to operate the zoom lens 102, the aperture 104, and the focus lens 106, respectively, in order to adjust a size of the subject, the intensity of light, or the focus.

The flash 144 may illuminate the subject when the subject is photographed in an outdoor place at night or in a dark place. When photographing is performed using the flash 144, the CPU 128 may transmit a flash command to the flash 144 and the flash 144 may emit light to illuminate the subject, according to the flash command output from the CPU 128.

The digital photographing apparatus 100 of the present embodiment has been described with reference to FIG. 1. The CPU 128 of the digital photographing apparatus 100 according to the present embodiment will now be described.

Figure 2:
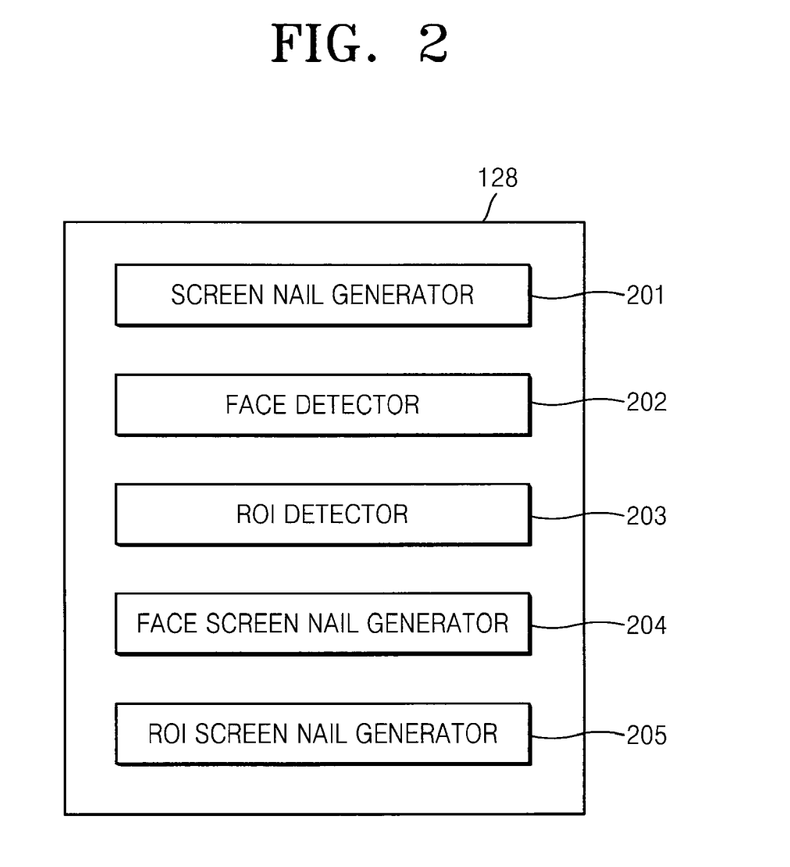
FIG. 2 is a schematic block diagram of an exemplary central processing unit (CPU) of FIG. 1.

FIG. 2 is schematic block diagram of an exemplary CPU 128 of FIG. 1. The structure of the CPU 128 of the present embodiment will now be described with reference to FIG. 2. The CPU 128 may control an overall operation of the digital photographing apparatus 100. In the present embodiment as illustrated in FIG. 2, the CPU 128 may include a face detector face 202 and a face screen nail generator 204 that are related to an extraction of a face region. The CPU 128 may also include an ROI detector 203 and an ROI screen nail generator 205 that are related to an extraction of a ROI. However, the present invention is not limited thereto and thus the CPU 128 may only include the face detector 202 and the face screen nail generator 204 that are related to an extraction of a face region and a generation of a face screen nail or the ROI detector 203 and the ROI screen nail generator 205 that are related to an extraction of a ROI and a generation of a ROI screen nail.

A screen nail generator 201 may generate a screen nail image using the RAW data output from the CMOS device 108. The screen nail image may include an image that is compressed to correspond to a size of a visible region of an LCD screen, apart from a thumb nail image. Such a screen nail image may be used to accelerate a reproduction of a digital photographing apparatus, e.g., the screen nail image may have a resolution of 640×480. In general, a digital photographing apparatus which is capable of performing high-speed still picture photographing may capture 60 frames of images per second and 60 images per second, generate 60 screen nail images, and show the 60 frames of images, the 60 images, and the 60 screen nail images to a user. The RAW data output from the CMOS device 108 may be stored in the memory 134 through the CDS amplifier 110, the ADC 112, and the image input controller 114. Processing of RAW data necessary for generating a screen nail image may be achieved by separately storing the RAW data for generating the screen nail images and full resolution RAW data in the memory 134. The screen nail generator 201 may read the full resolution RAW data, which is output from the CMOS device 108 and temporarily stored in the memory 134, from the memory 134 to extract RAW data necessary to generate the screen nail image. Here, the screen nail image may be developed by the image signal processing unit 116, compressed by the compression processing unit 120, and displayed on the LCD 124.

The face detector 202 may detect a predetermined face region of the screen nail image. The screen nail image generated by the screen nail generator 201 or the screen nail image developed by the image signal processing unit 116 may be input to the face detector 202. In general, an image having a size nearly equal to a screen nail image, e.g., an image having a size of 640×480, may be input to the face detector 202 to detect a face. A position of the face may be detected from the input image to detect the face. The face detector 202 may compare pre-stored characteristic data of the face with input image data to recognize whether the input image data includes face data. If a determination is made that the input image data includes the face data, the face detector 202 may recognize a position of the face data in the input image data. A large number of face region detection techniques or algorithms have been introduced and may be used in the present embodiment. For example, a motion vector technique, a characteristic detection technique, an Adaboost learning technique, etc., may be used to detect a face region.

The face detector 202 may detect coordinates of the face region of the screen nail image and store the coordinates of the face region frame by frame. The face screen nail generator 204 may generate a face screen nail image using the coordinates of the face region detected from the screen nail image. Here, the face screen nail image corresponds to a face region that is detected to be adjusted to a size of the screen nail image and then is magnified. As described in the present embodiment illustrated in FIG. 2, the face screen nail generator 204 generates a face screen nail image. However, the face screen nail generator 204 may also detect a face and various objects and generate object screen nail images using the above-described method. Also, if a size of the face varies, the face screen nail generator 204 may determine the coordinates of the face region detected by the face detector 202 to re-size the detected face so that the detected face is included in the face screen nail image. A scaler for performing such re-sizing may be included in the CPU 128 or the image signal processing unit 116.

The face screen nail image generated by the face screen nail generator 204 may be displayed frame by frame using the LCD 124. A user may display well-photographed pictures in a predetermined check box to select only the well-photographed pictures among the displayed face screen nail images and thus selectively store desired pictures in the recording medium 140.

The ROI detector 203 may receive the screen nail image to detect a ROI that is pre-set by the user. Here, the ROI is a region that the user pre-sets on a preview screen using the operator 132. A user may set a desired region of a composition of a subject to be photographed, to a ROI in a rectangular window or one of various forms of windows.

The ROI screen nail generator 205 may generate a ROI screen nail image from the screen nail image using coordinates of the ROI detected by the ROI detector 203.

As described in the present embodiment illustrated in FIGS. 1 and 2, the digital photographing apparatus 100 separately includes the CPU 128, the image signal processing unit 116, and the compression processing unit 120; however, the present invention is not limited thereto and thus the digital photographing apparatus 100 may include a digital signal processor (DSP) chip in which the CPU 128, the image signal processing unit 116, and the compression processing unit 120 are integrated.

The face screen nail generator 204 and the ROI screen nail generator 205 may not respectively generate the face screen nail image and the ROI screen nail image from the full resolution RAW data, but respectively may generate the face screen nail image and the ROI screen nail image from the screen nail image that has a reduced size. Thus, high-speed processing is possible. Also, the user may check the face region or the ROI, along with the screen nail image corresponding to a reduced image of the whole image, to select and store only a well-photographed picture. Thus, power consumption and storage time may be reduced.

Figure 3:
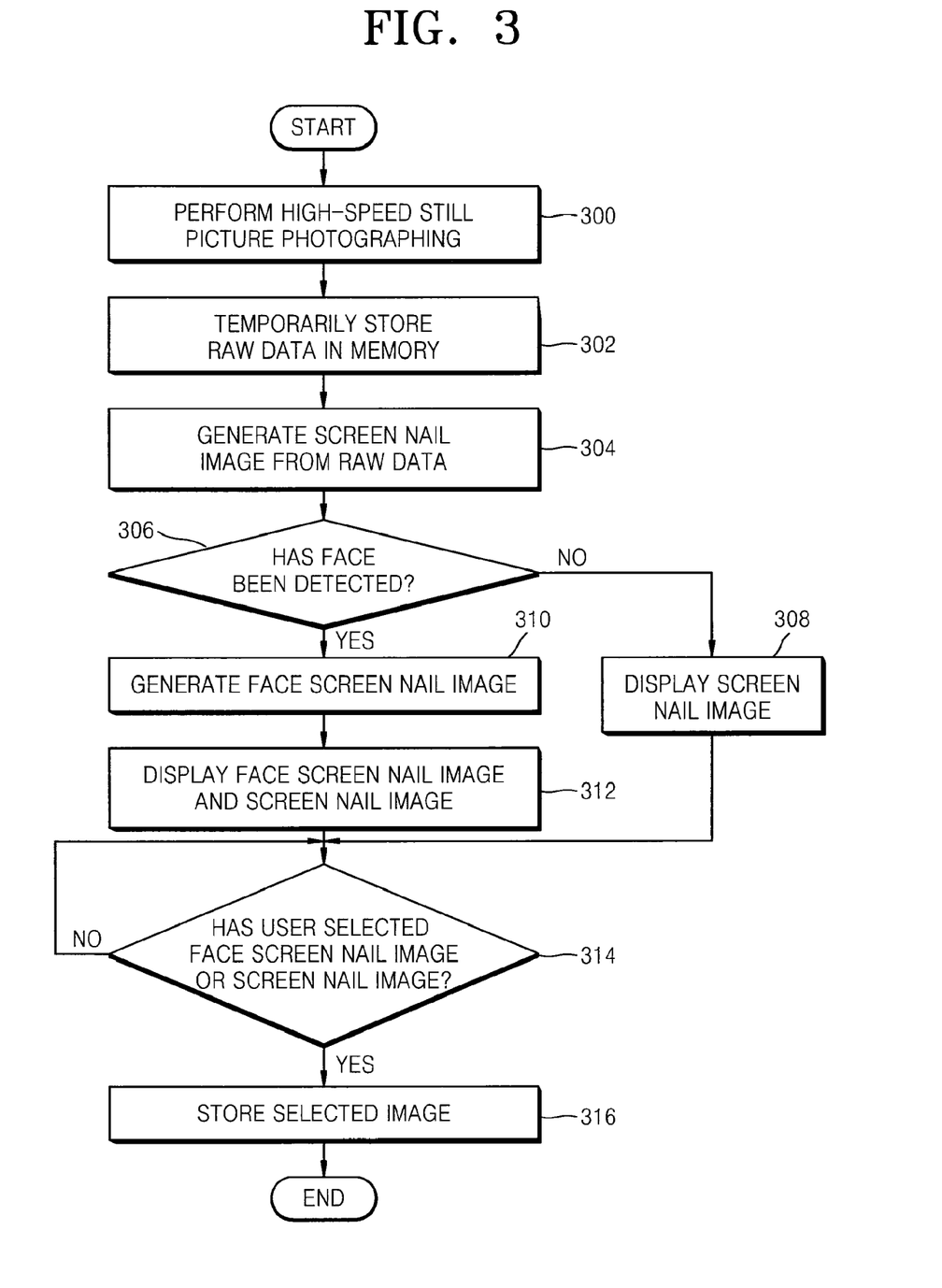
FIG. 3 is a flowchart of an exemplary image processing method.

FIG. 3 is a flowchart of an exemplary image processing method. In an operation 300, high-speed still picture photographing may be performed. In an operation 302, RAW data may be temporarily stored in a memory. In an operation 304, the RAW data may be extracted from the memory to generate a screen nail image. In an operation 306, a determination may be made as to whether a face has been detected. If a determination is made in operation 306 that the face has been detected, the method proceeds to an operation 310 to generate a face screen nail image which may have the same size as the screen nail image using coordinates of the detected face. If a determination is made in operation 306 that the face has not been detected, the method proceeds to an operation 308 to display the screen nail image.

In an operation 312, the face screen nail image and the screen nail image may be displayed. Alternatively, only the face screen nail image may be displayed, and if the user selects the face screen nail image, the screen nail image corresponding to the face screen nail image may be displayed. Also, the face screen nail image and the screen nail image may be displayed together.

Figure 5:
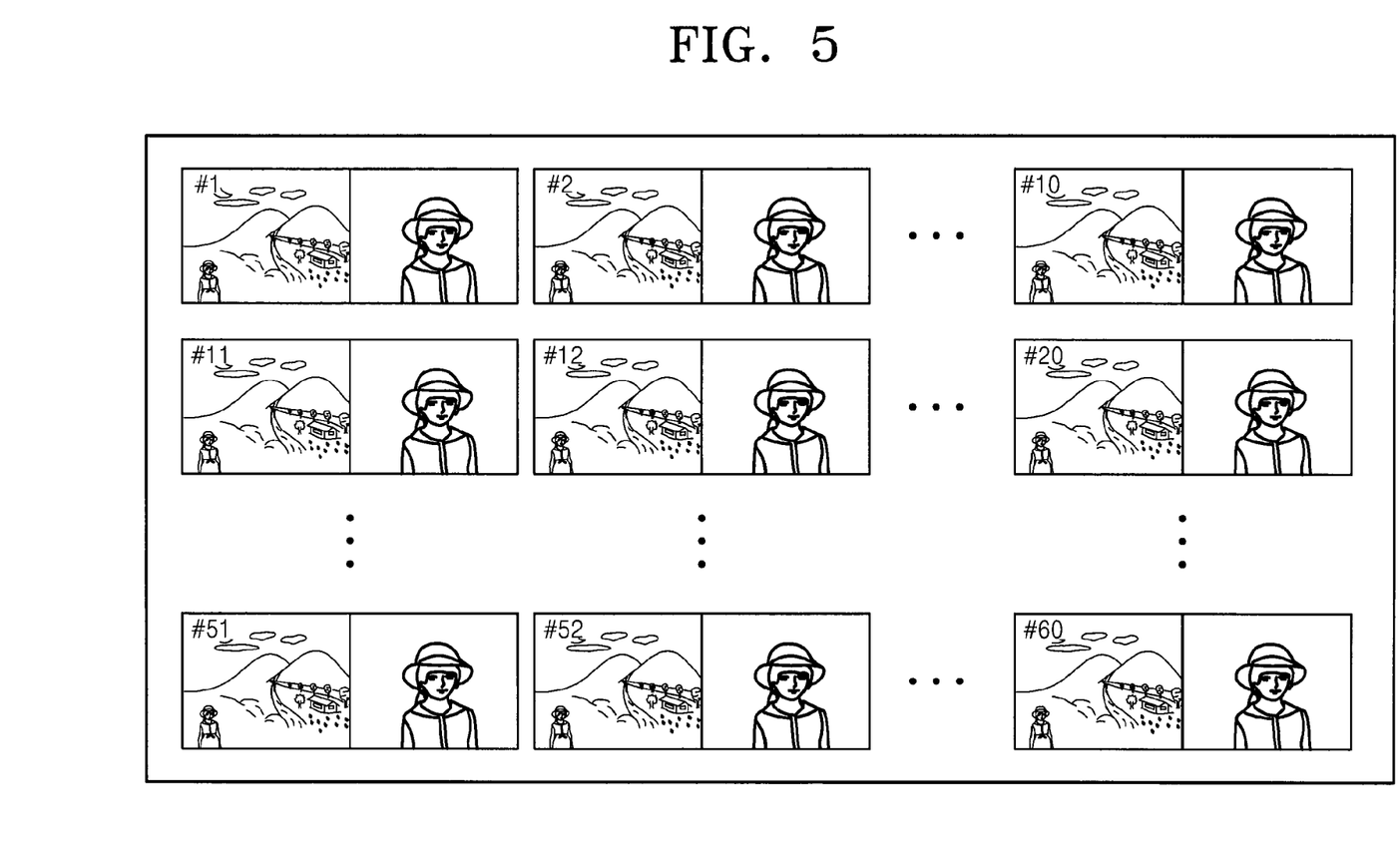
FIG. 5 illustrates exemplary screen nail images and face screen nail images.

As an example, FIG. 5 illustrates exemplary screen nail images and face screen nail images. As illustrated in FIG. 5, 60 pictures may be displayed on a screen. Here, the 60 pictures may be photographed in 60 frames at a high speed, and a screen nail image and a face screen nail image may be displayed together in each of the 60 frames. A user may check composition and contrast of the whole screen using the screen nail images, check whether a focus has been correctly adjusted during photographing of a person or whether noise or quivering has occurred using face screen nail images, and selectively store desired frames.

In an operation 314, a determination may be made as to whether the user has selected a face screen nail image or a screen nail image in a specific frame. If a determination is made in operation 314 that the user has selected the face screen nail image or the screen nail image in the specific frame, the selected face screen nail image or screen nail image may be stored in a recording medium in an operation 316. In detail, a raw image of the selected face screen nail image or the screen nail image may be stored in the recording medium.

Figure 4:
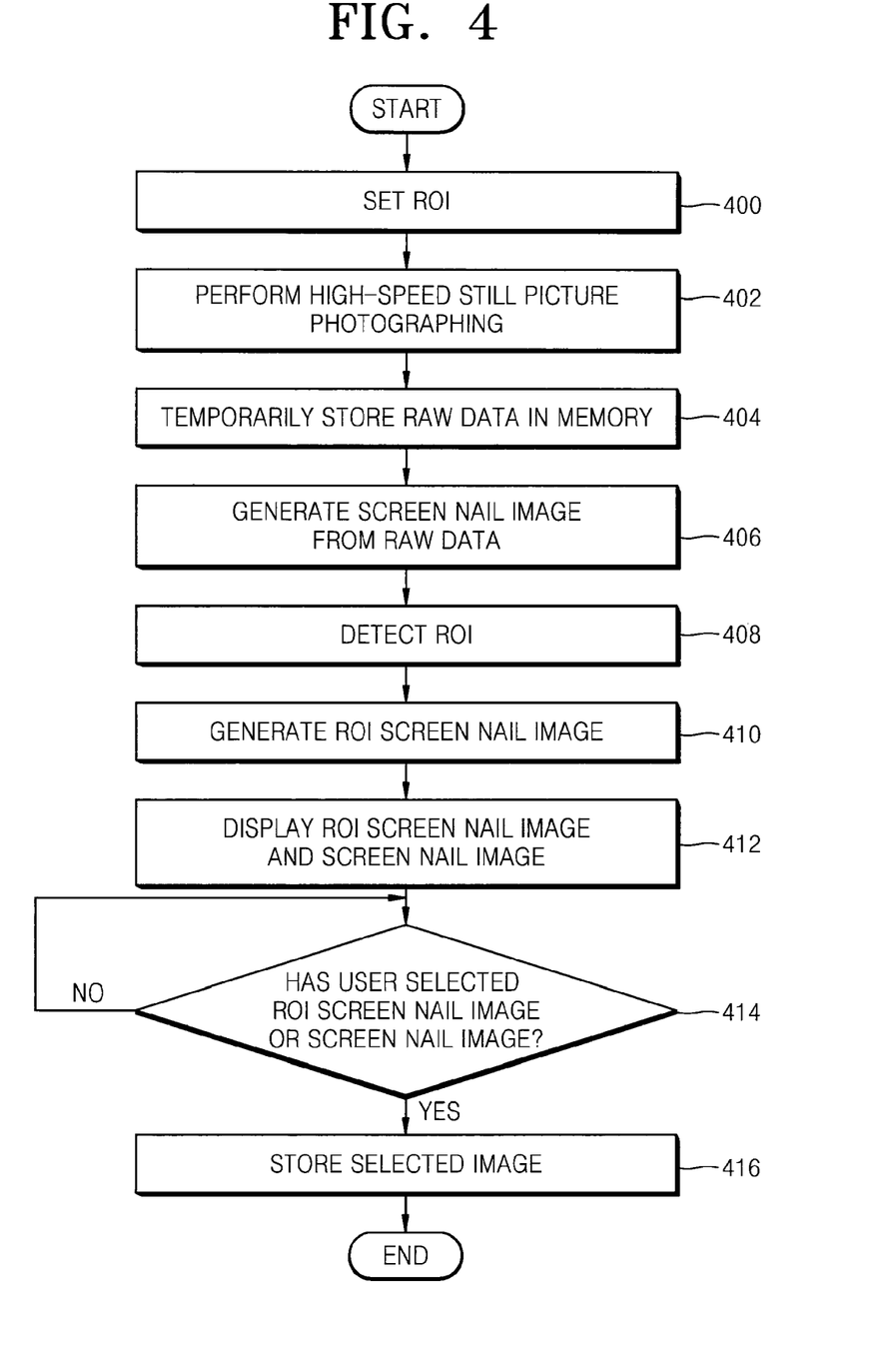
FIG. 4 is a flowchart of another exemplary image processing method.

FIG. 4 is a flowchart of another exemplary image processing method. In an operation 400, a ROI may be set. A user may select on a preview screen only a specific part from a composition that the user desires to photograph.

Figure 6:
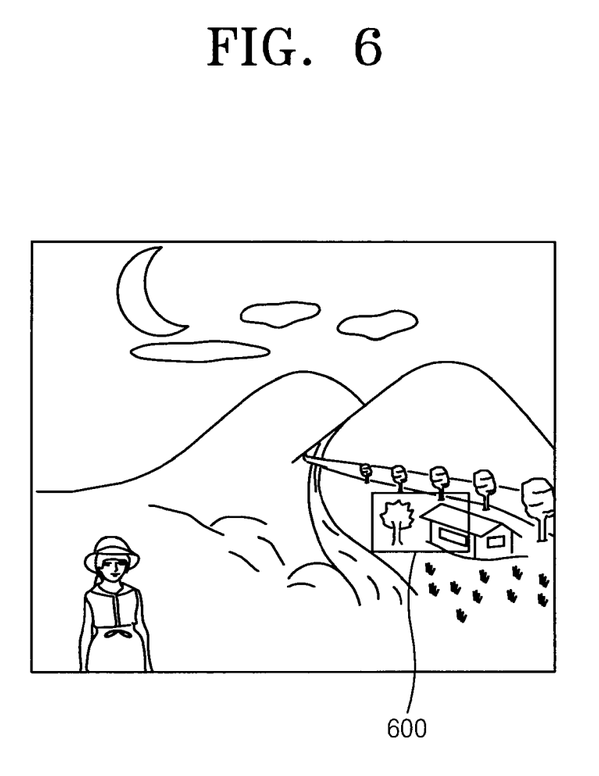
FIG. 6 illustrates an exemplary method of setting a Region Of Interest (ROI).

As an example, FIG. 6 illustrates an exemplary method of setting a ROI. A region 600 including a house and a tree may be set in a rectangular window.

In an operation 402, high-speed still picture photographing may be performed. In an operation 404, RAW data may be temporarily stored in a memory. In an operation 406, a screen nail image may be generated from the RAW data. In an operation 408, a ROI that is pre-set by a user may be detected. In detail, the ROI may correspond to the region 600 that is desired by the user, as shown in FIG. 6. In an operation 410, a ROI screen nail image may be generated from the screen nail image. In an operation 412, the ROI screen nail image and the screen nail image may be displayed in each frame.

Figure 7:
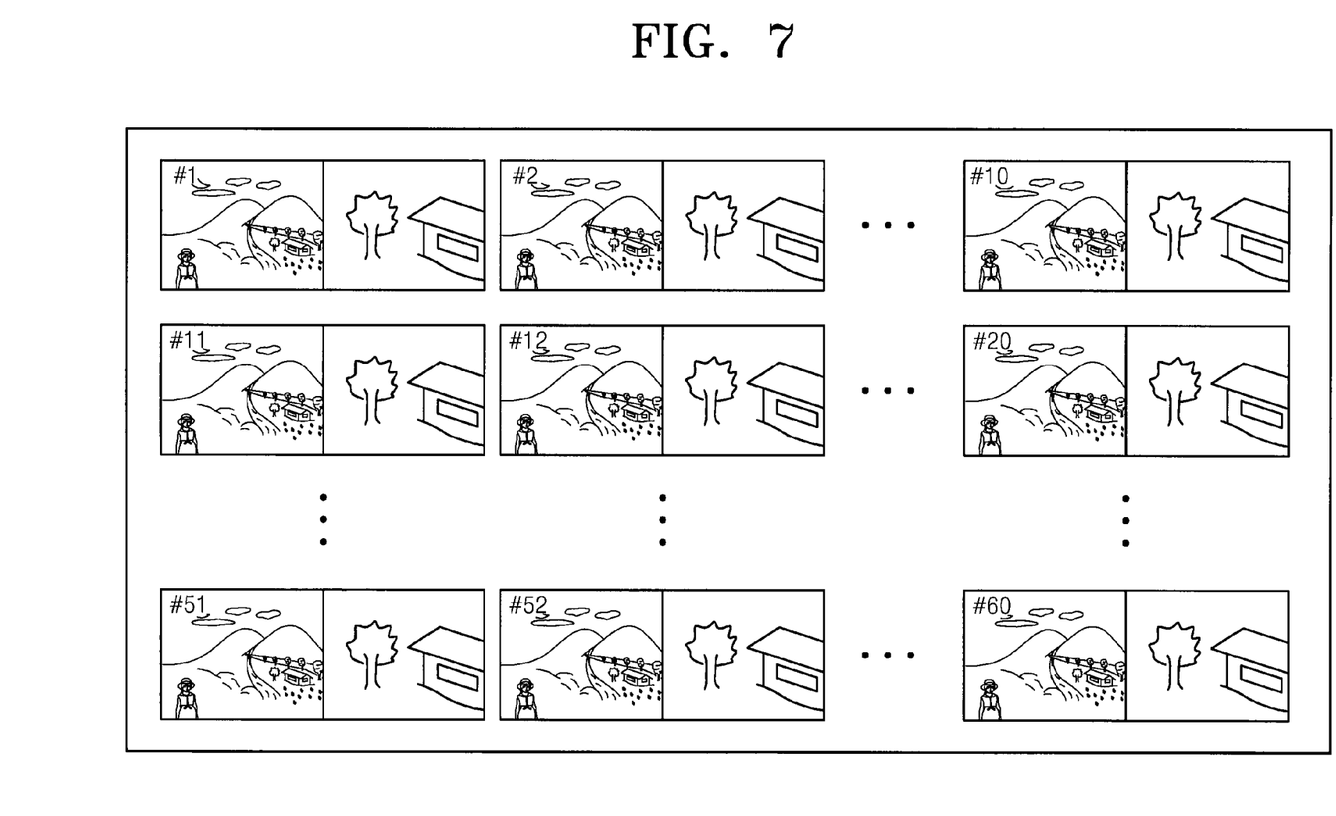
FIG. 7 illustrates exemplary screen nail images and ROI screen nail images.

As an example, FIG. 7 illustrates exemplary screen nail images and ROI screen nail images. As illustrated in FIG. 7, 60 pictures may be displayed on a screen. Here, the 60 pictures may be photographed in 60 frames per second at a high speed, and a screen nail image and a ROI screen nail image may be displayed together in each frame. A user may check composition and contrast of the whole screen using the screen nail images, check whether a focus has been correctly adjusted in the pre-set region 600 or noise or shaking has occurred, using the ROI screen nail images, and selectively store desired frames.

In an operation 414, a determination may be made as to whether the user has selected a ROI screen nail image or a screen nail image in a specific frame. If a determination is made in operation 414 that the user has selected the ROI screen nail image or the screen nail image in the specific frame, the selected ROI screen nail image or screen nail image is stored in a recording medium in an operation 416. In detail, a raw image of the selected ROI screen nail image or the screen nail image may be stored in the recording medium.

The above-described embodiments may be applied to a digital photographing apparatus such as a digital camera, but the embodiments are not limited thereto. It will be understood by those of ordinary skill in the art that the embodiments may be applied to camera phones having camera functions, personal digital assistants (PDAs), and portable multimedia players (PMPs).

According to the above-described embodiments, a screen nail image and a face screen nail image may be developed and displayed rather than a full resolution image. Thus, power consumption and processing time delay caused by processing all parts of a full resolution image may be minimized, and a quality of the full resolution image may be conveniently checked. As a result, a user may conveniently select and store an image in high-speed still picture photographing.

A program for executing a method as described herein may be stored in a computer readable storage medium. The program may include instructions (e.g., code) executable by a processor such as the CPU 128. The computer readable storage medium may include the memory 134, the VRAM 136, or the recording medium 140 illustrated in FIG. 1. The computer readable storage medium may include memory implemented in an integrated circuit (e.g., random access memory (RAM), read-only memory (ROM), erasable programmable read only memory (EPROM), static RAM (SRAM), or flash memory), a magnetic storage medium (e.g., floppy disk, hard disk, magnetic tapes), an optical storage medium (e.g., compact disc (CD or CD-ROM) or digital versatile disc (DVD or DVD-ROM)), or carrier waves (such as data transmission through the Internet). The computer readable storage medium may also be distributed over network coupled computer systems so that the computer readable instructions are stored and executed in a distributed fashion. Also, functional programs, codes, and code segments for accomplishing embodiments of the present invention may be construed by programmers skilled in the art to which the present invention pertains without undue experimentation.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. An image processing method comprising:
   generating a screen nail image using RAW data output from an image sensor of a digital photographing apparatus before recording a raw image corresponding to the RAW data;
   detecting a predetermined face region of the screen nail image;
   generating a face screen nail image from the screen nail image using coordinates of the detected face region; and
   recording the raw image from the RAW data in a predetermined recording medium of the digital photographing apparatus in response to a selection signal for the screen nail image or the face screen nail image.

2. The image processing method of claim 1, wherein the image sensor includes a high-speed CMOS (Complementary Metal Oxide Semiconductor) image sensor.

3. The image processing method of claim 1, further comprising displaying the face screen nail image.

4. The image processing method of claim 3, further comprising, when a user selects the displayed face screen nail image, displaying the screen nail image corresponding to the face screen nail image.

5. The image processing method of claim 4, further comprising, when the user selects one of the displayed face screen nail image and screen nail image, recording a raw image corresponding to the selected one of the displayed face screen nail image and screen nail image in the predetermined recording medium of the digital photographing apparatus.

6. The image processing method of claim 1, further comprising displaying the screen nail image and the face screen nail image together.

7. The image processing method of claim 1, further comprising storing the RAW data output from the image sensor in a memory.

8. The image processing method of claim 1, further comprising, when a size of the detected face region varies, re-sizing the size of the face region to correspond to that of the face region of the face screen nail image.

9. An image processing method comprising:
   setting a ROI (Region Of Interest) of a predetermined subject prior to photographing the subject;
   photographing the subject;
   generating a screen nail image using RAW data output from a high-speed CMOS (Complementary Metal Oxide Semiconductor) image sensor before recording a raw image from the RAW data in a predetermined recording medium;
   generating a ROI screen nail image from the screen nail image using coordinates of the set ROI; and
   displaying the ROI screen nail image.

10. The image processing method of claim 9, wherein when a user selects the displayed ROI screen nail image, displaying the ROI screen nail image further comprises displaying the screen nail image corresponding to the ROI screen nail image.

11. The image processing method of claim 9, wherein the ROI is selected by a user using a preview screen.

12. A non-transitory computer-readable storage medium having stored thereon a computer program executable by a processor for performing an image processing method comprising:
   generating a screen nail image using RAW data output from an image sensor of a digital photographing apparatus before recording a raw image corresponding to the RAW data;
   detecting a predetermined face region of the screen nail image;
   generating a face screen nail image from the screen nail image using coordinates of the detected face region; and
   recording the raw image from the RAW data in a predetermined recording medium of the digital photographing apparatus in response to a selection signal for the screen nail image or the face screen nail image.

13. An image processing apparatus comprising:
   a screen nail generator which generates a screen nail image using RAW data output from an image sensor before recording a raw image from the RAW data in a predetermined recording medium;

a ROI (Region Of Interest) detector which detects a ROI selected by a user using a preview screen prior to photographing; and a ROI screen nail generator which generates a ROI screen nail image from the screen nail image using coordinates of the detected ROI.

14. The image processing apparatus of claim 13, wherein the image sensor includes a high-speed CMOS (Complementary Metal Oxide Semiconductor) image sensor.

15. The image processing apparatus of claim 14, further comprising a display which selectively displays one of the screen nail image and the ROI screen nail image.

16. The image processing apparatus of claim 14, further comprising:

a face detector which detects a predetermined face region of the screen nail image; and a face screen nail generator which generates a face screen nail image from the screen nail image using coordinates of the detected face region.

17. The image processing apparatus of claim 16, further comprising a display which selectively displays the screen nail image and the face screen nail image.

18. A digital photographing apparatus comprising:

a memory which temporarily stores RAW data output from a high-speed CMOS (Complementary Metal Oxide Semiconductor) image sensor;

a screen nail generator which generates a screen nail image using the stored RAW data before recording the raw image from the RAW data in the predetermined recording medium;

a ROI (Region Of Interest) detector which detects a ROI selected by a user using a preview screen prior to photographing;

a ROI screen nail generator which generates a ROI screen nail image from the screen nail image using coordinates of the detected ROI;

an image signal processing unit which develops the screen nail image and the ROI screen nail image; and a display which selectively displays the developed screen nail image and the ROI screen nail image.

19. The digital photographing apparatus of claim 18, further comprising:

a face detector which detects a predetermined face region of the screen nail image; and a face screen nail generator which generates a face screen nail image from the screen nail image using coordinates of the detected face region.

20. The digital photographing apparatus of claim 19, wherein the display selectively displays the screen nail image and the face screen nail image.

* * * * *